(12) United States Patent
Adis et al.

(10) Patent No.: US 8,250,756 B2
(45) Date of Patent: Aug. 28, 2012

(54) METHOD OF MANUFACTURE OF COMPLIANT PLATE SEALS

(75) Inventors: William Edward Adis, Scotia, NY (US); Bernard Arthur Couture, Jr., Schenectady, NY (US); Hrishikesh Vishvas Deo, Guilderland, NY (US); Sean Douglas Feeny, Ballston Spa, NY (US); Michael Dennis Mack, Ballston Spa, NY (US); Daniel Frederick Purdy, Schenectady, NY (US); Norman Arnold Turnquist, Sloansville, NY (US)

(73) Assignee: General Electric Company, Schenectady, NY (US)

( * ) Notice: Subject to any disclaimer, the term of this patent is extended or adjusted under 35 U.S.C. 154(b) by 700 days.

(21) Appl. No.: 12/389,757

(22) Filed: Feb. 20, 2009

(65) Prior Publication Data
US 2010/0213675 A1 Aug. 26, 2010

(51) Int. Cl.
*B21D 53/84* (2006.01)
(52) U.S. Cl. ............... 29/888.3; 29/402.02; 29/402.07; 29/464; 277/355; 277/630; 277/632
(58) Field of Classification Search ............ 29/888.3, 29/402.07, 428, 281.1, 402.02, 402.03, 464; 277/355, 632, 630; 228/44.3
See application file for complete search history.

(56) References Cited

U.S. PATENT DOCUMENTS

| 4,989,919 | A | * | 2/1991 | Greer ........................... 300/10 |
| 7,201,378 | B2 | | 4/2007 | Kono |
| 7,334,328 | B2 | | 2/2008 | Uehara et al. |
| 7,419,164 | B2 | | 9/2008 | Awtar et al. |
| 2007/0102886 | A1 | * | 5/2007 | Uehara et al. ............... 277/355 |
| 2007/0120326 | A1 | | 5/2007 | Rhodes et al. |
| 2008/0042365 | A1 | | 2/2008 | Awtar et al. |
| 2008/0099999 | A1 | * | 5/2008 | Williams ...................... 277/355 |
| 2008/0169614 | A1 | | 7/2008 | Awtar et al. |
| 2008/0272553 | A1 | | 11/2008 | Awtar et al. |
| 2010/0176556 | A1 | * | 7/2010 | Mack et al. .................. 277/411 |

FOREIGN PATENT DOCUMENTS
EP 1878955 A1 1/2008
EP 1900983 A1 3/2008

OTHER PUBLICATIONS

Partial European Search Report issued Feb. 14, 2011 in conncection with corresponding EP Application No. 10153023.6.

\* cited by examiner

*Primary Examiner* — David Bryant
*Assistant Examiner* — Ryan J Walters
(74) *Attorney, Agent, or Firm* — Cantor Colburn LLP

(57) ABSTRACT

A compliant plate seal arrangement manufacturing method is provided. A compliant plate seal manufacturing method includes assembling a plurality of t-shims and a plurality of spacer shims into a straight weld fixture, thereby forming a shim pack having a front and rear end and sides, welding the sides of the shim pack to a top plate, removing a portion of the weld fixture, removing the plurality of spacer shims, shaping the shim pack into a target diameter, and applying a radial flow plate to the leaf pack.

11 Claims, 12 Drawing Sheets

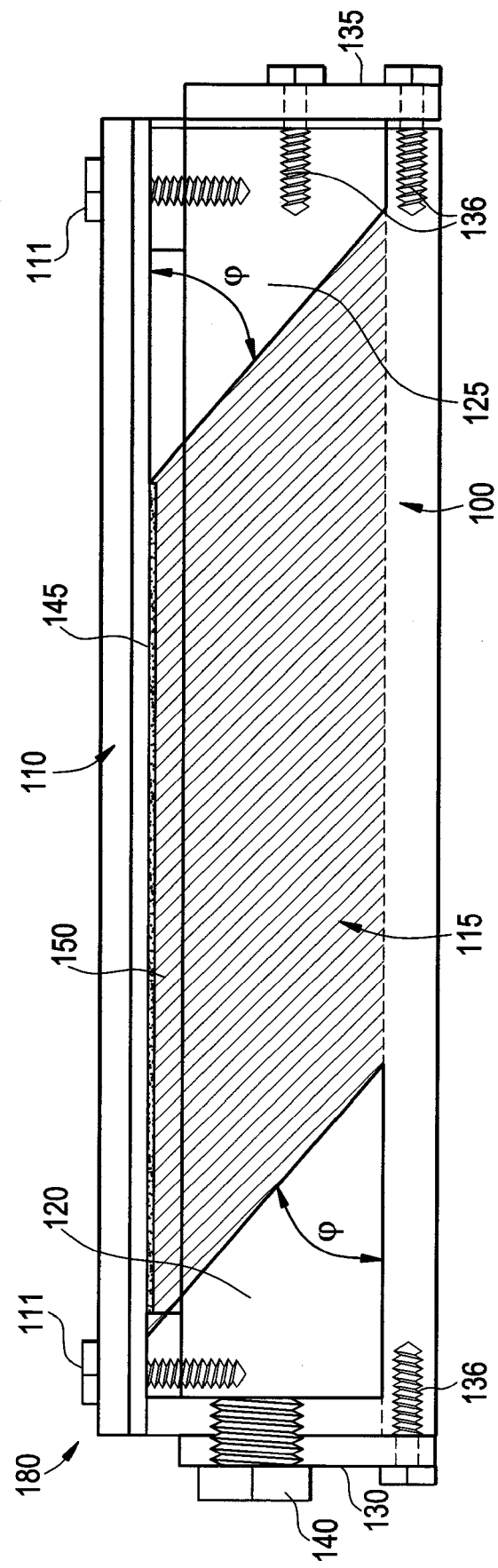

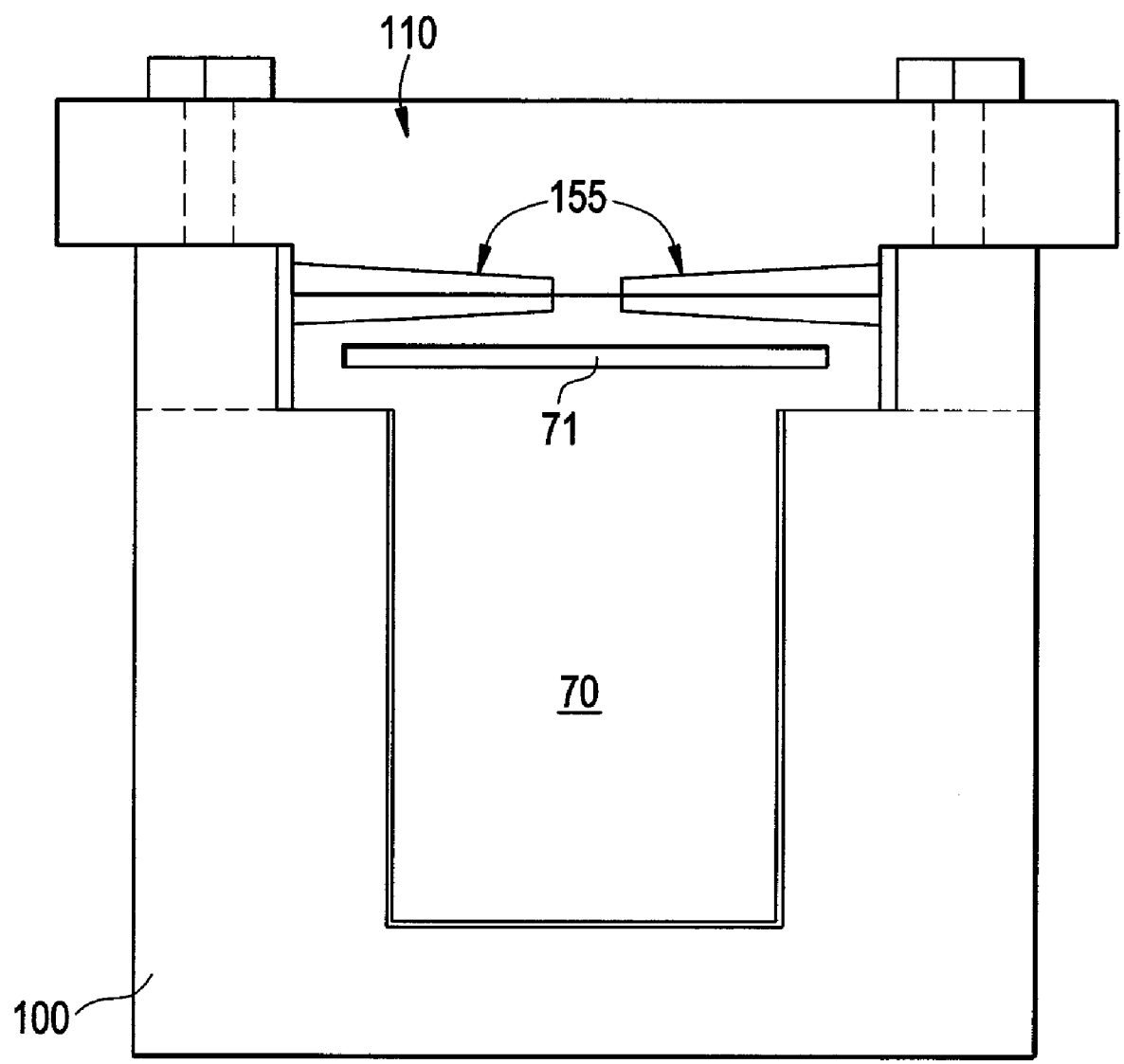

METHOD OF MANUFACTURE OF COMPLIANT PLATE SEALS

BACKGROUND OF THE INVENTION

The subject matter disclosed herein relates to a sealing structure between a rotating component and a static component and, more particularly, to a compliant plate seal arrangement manufacturing method.

Dynamic sealing between a rotor (e.g., rotating shaft) and a stator (e.g., static shell or casing) is an important concern in turbomachinery. Several methods of sealing have been used. In particular, sealing based on flexible members has been used that include seal members such as compliant plate seals.

Known brush seals include tightly-packed, generally cylindrical bristles that are arranged in a staggered arrangement to reduce leakage. The bristles have a low radial stiffness that allows them to move in the event of a rotor excursion while maintaining a tight clearance during steady state operations. Brush seals, however, are generally effective only below a limited pressure differential across the seal. Because of the generally cylindrical geometry of the bristles, the brush seals tend to have a low stiffness in the axial direction, which limits the maximum operable pressure differential in known brush seals to generally less than 400 psi.

Compliant plate seals have plate-like elements that have a significantly higher axial stiffness for a comparable radial stiffness and therefore such seals have the capability of being used with larger pressure differentials than known brush seals.

Compliant plate seals, often including thin plate like elements assembled together as a pack, are welded to a housing that supports the plates relative to a rotor (e.g., a rotating shaft). One method of joining is by welding. During the welding process, the joined region of the compliant members can shrink which causes distortion and wrinkling of the compliant plate elements, which can affect the radial stiffness of and the force distribution on the compliant plates, which can lead to several problems including increased axial leakage and rotor heating.

BRIEF DESCRIPTION OF THE INVENTION

According to one aspect of the invention, a compliant plate seal manufacturing method is provided. The method includes assembling t-shims and spacer shims along a straight line into a weld fixture, thereby forming a shim pack having a front and rear end and sides. The method further includes welding the sides of the shim pack, removing the joined seal segment from the weld fixture, and removing the spacer shims. The method further includes shaping the leaf pack into a target diameter and applying an intermediate radial flow plate to the leaf pack, wherein the shim pack includes a radial cutout region.

According to another aspect of the invention, a seal assembly is provided. The seal assembly includes a top plate and a shim pack welded to the top plate, wherein the shim pack includes alternately arranged t-shims and spacer shims in which a lower portion of the spacer shims have been removed. The seal assembly further includes a radial flow plate coupled to the top plate, wherein the top plate includes a central or offset portion machined out and aligned with the inside edges of the cutouts of the t-shims, the top plate includes a central portion machined to join a cut out on each of the t-shims, ends of the arcuate seal segments are finished to a specified chord length and a finish cut is parallel to the plane of the t-shims and tips of the t-shims are machined to a finished diameter.

According to yet another aspect of the invention, a weld fixture assembly is provided. The weld fixture assembly includes a weld fixture body having an elongate channel therein and alternately arranged t-shims and spacer shims disposed in the channel forming a shim pack. The weld fixture assembly further includes an angle block disposed on either end of the shim pack establishing an angle of the shim pack with respect to a top plate of the weld fixture and end plates coupled to either end of the weld fixture body. The end plates include jacking screws, which when turned, slide the angle blocks inward within the weld fixture body thereby compacting and removing undesirable gaps between the alternately arranged t-shims and spacer shims in preparation for weld. The weld fixture can further include a window formed between the top plate and the weld fixture body.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing, and other features and advantages of the invention are apparent from the following detailed description taken in conjunction with the accompanying drawings in which:

FIG. 10 illustrates a side section view of an assembled weld fixture assembly;

FIG. 11 illustrates a front section view of the welded compliant plate seal still within the weld fixture illustrating welds along a weld region defined between a top plate and a shim pack;

Figure 1:
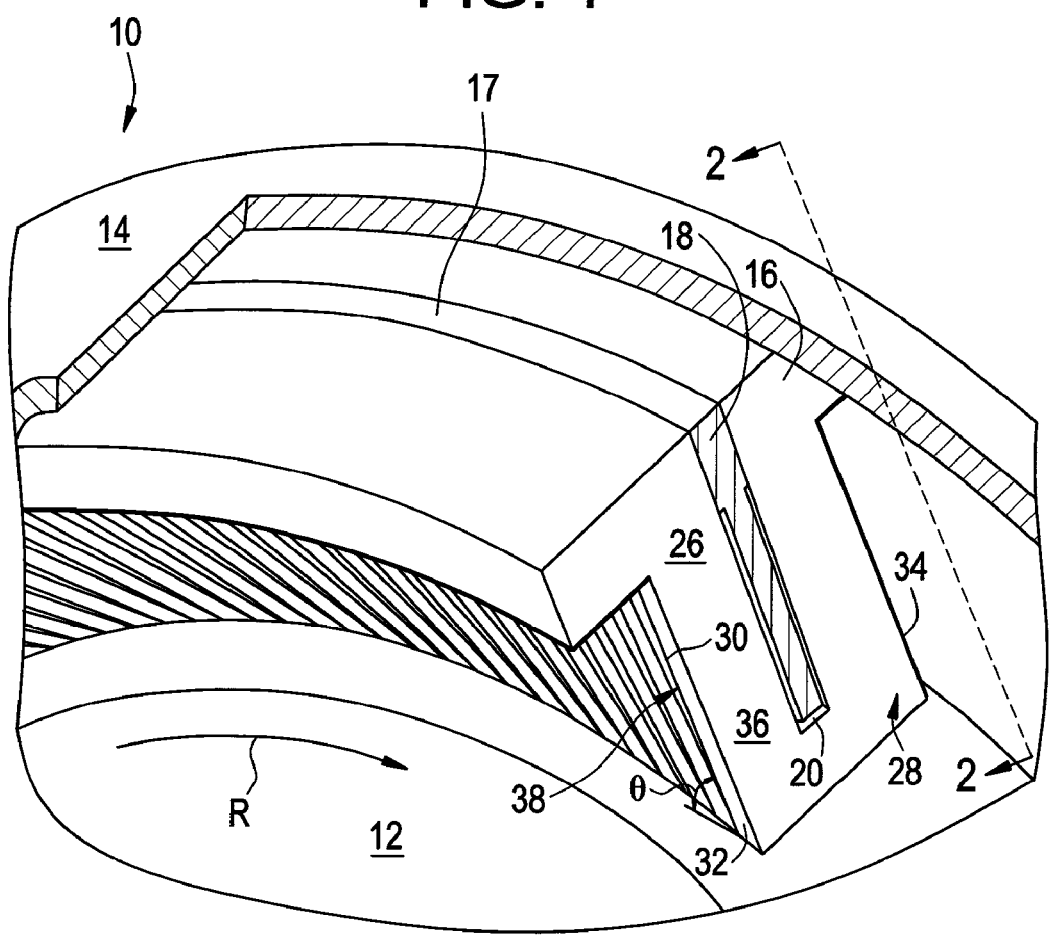
FIG. 1 is a perspective view of an exemplary compliant plate seal assembly 10 as manufactured in accordance with exemplary embodiments.

The detailed description explains embodiments of the invention, together with advantages and features, by way of example with reference to the drawings.

DETAILED DESCRIPTION OF THE INVENTION

Exemplary embodiments include a compliant seal manufacturing method that reduces distortion, deformity, differential shrinkage and other associated problems with welding across gaps between compliant plate seals as is typical in current manufacturing processes. In exemplary embodiments, compliant plate seals are joined in a straight form and then later bent to a diameter suitable for use in sealing opposite a rotor. In exemplary embodiments, alternating spacer shims and T-shims are stacked in a straight fixture against angle blocks and compressed to eliminate any gaps. The spacer shims include a pocket that permits a later machining operation that removes a lower portion of the spacer. A top edge of the compressed shim pack is aligned against a top plate. A top flat surface of the shim pack is welded to the bottom surface of the top plate implementing a deep narrow electron beam or laser weld. A weld is performed on each side of the top plate. The left and right sides of the upper welded shim pack are machined to allow the lower portion of the spacer shims to be removed. After removal of the lower portion of the spacer shims, the top surface and the bottom left and right faces of the top plate are used to bend the seal into an arcuate segment of some prescribed diameter suitable for the final application in a turbomachine. After the bend, a center portion of the top plate is removed to permit assembly of a machined arcuate housing with a radial flow restrictor plate. The top housing is mechanically assembled or welded to the T-plate pack. The tips of the T-shims are machined to a final rotor diameter. The left and right sides of the assembly are machined off at an angle coplanar to the T-shim pack and at the required sealing segment chord length. There can be several segments per 360-degree seal.

The entire edge of T-shims can be fully joined to the top plate by welding with a metallurgical bond, using a method of fixturing, which packs the shims very tightly. Therefore, when welded, the impact of weld shrinkage causing T-plate distortion is minimized. T-plate spacing is held very accurate with this method. This method also minimizes T-shim stress and leakage. Joining the leaves in a straight configuration minimizes costs associated with custom weld fixturing for each seal diameter. Seals of any diameter can be bent from the straight stock. An appropriate size spacer shim is chosen for the range of diameters being bent. The straight fixture allows precise axial positioning of thousands of shims to within several tenths of a mil or less. Accurate and repeatable spacing between compliant members is important to achieving minimum compliant plate stress during operation as well as minimized seal leakage. A straight method of stacking with alternating spacer shim and T-shims lends itself to a machine-based automated shim stack process, further reducing hand or manual stacking operations for assembling shims. This is a cost and cycle advantage over arcuate housings, which are assembled more manually.

The improved compliant plate seal manufacturing method described herein provides a structure that prevents distortion, deformity, differential shrinkage and other associated problems with welding across gaps between compliant plate seals.

Figure 2:
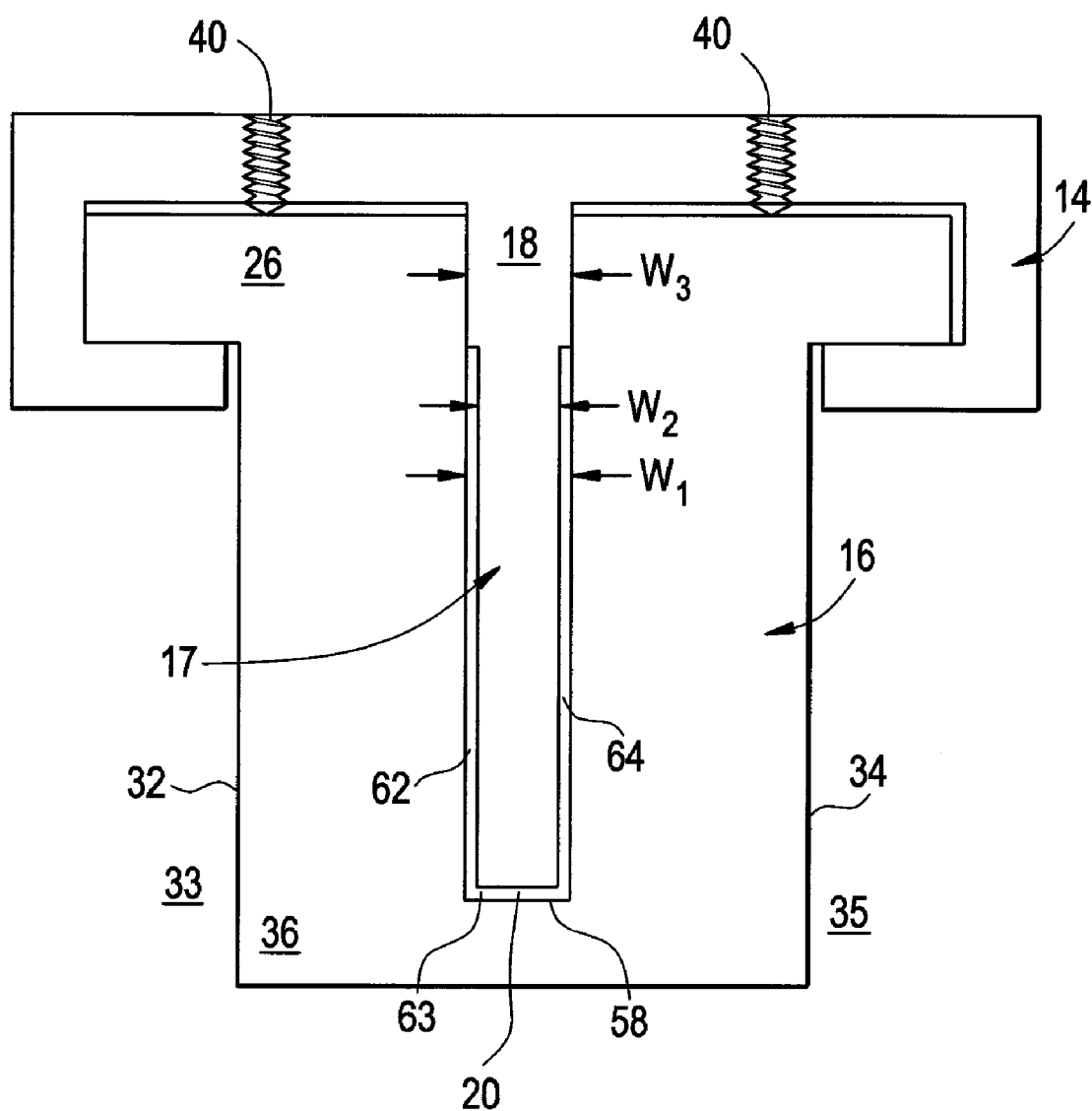
FIG. 2 is a cross-sectional view of seal assembly 10 in FIG. 1.
Figure 6:
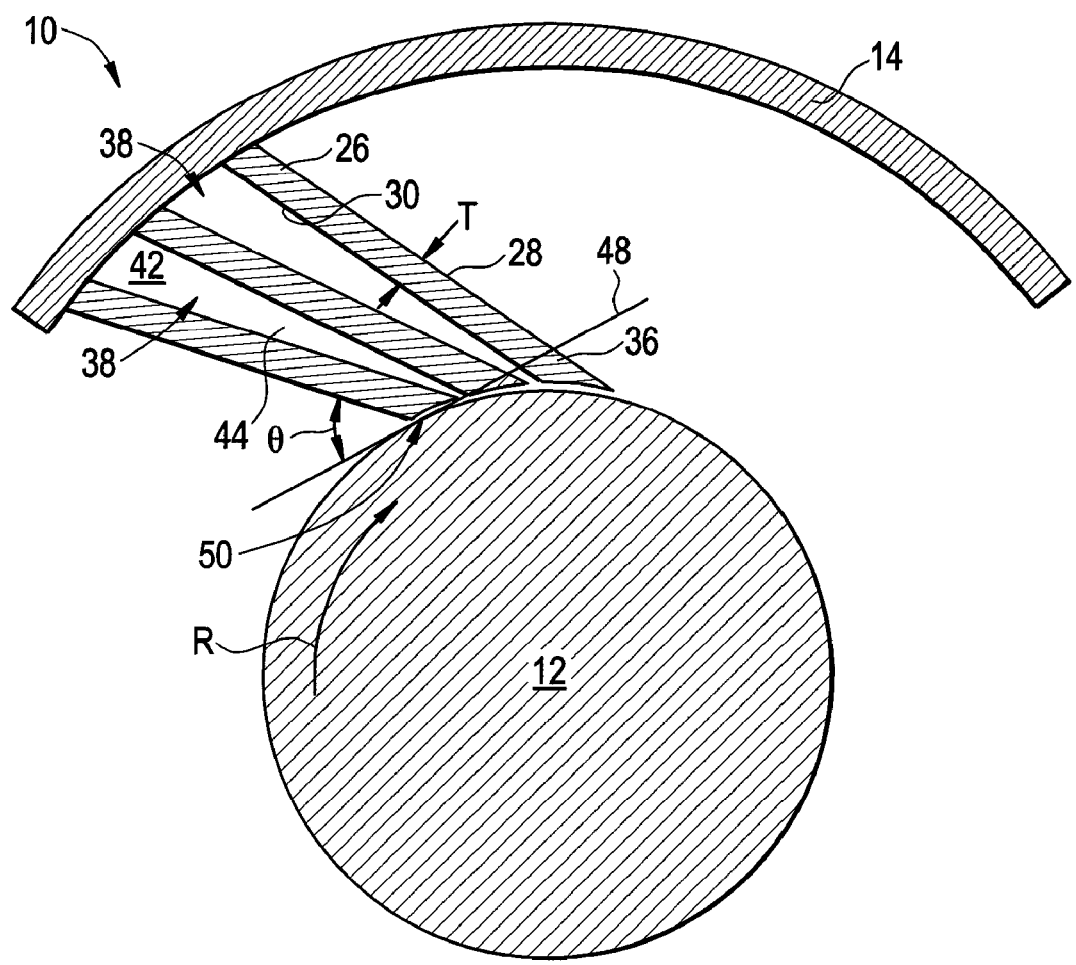
FIG. 6 is a cross-sectional view of seal assembly 10 shown in FIG. 2.

FIG. 1 is a perspective view of an exemplary compliant plate seal assembly 10 as manufactured in accordance with exemplary embodiments described herein. FIG. 2 is a cross-sectional view of seal assembly 10 taken along line 2-2. More specifically, in FIG. 2, seal assembly 10 is illustrated in a radially outward or retracted position, as described herein. FIG. 6 is a cross-sectional view of seal assembly 10 shown in FIG. 2, with the presence of a rotor 12.

Figure 3:
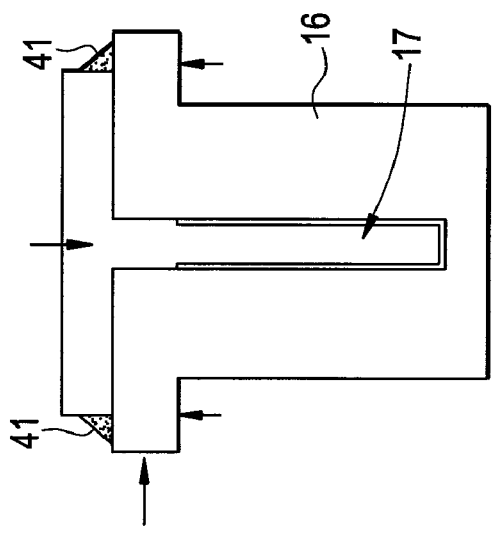
FIG. 3 is another cross-sectional view of seal assembly 10 in FIG. 1.
Figure 4:
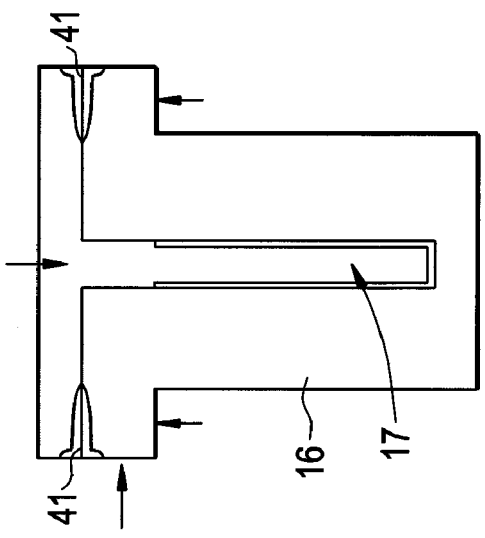
FIG. 4 is another cross-sectional view of seal assembly 10 in FIG. 1.
Figure 5:
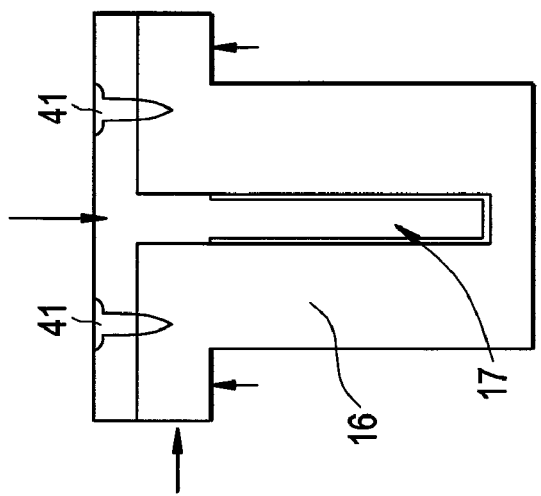
FIG. 5 is another cross-sectional view of seal assembly 10 in FIG. 1.

In exemplary embodiments, the compliant plate seal assembly 10 facilitates reducing axial leakage between rotor 12, such as a rotating shaft, and the housing 14. More specifically, the housing 14 is coupled to a turbine static shell or stator such that rotor 12 rotates relative to housing 14. In exemplary embodiments, the housing 14 may be coupled within the stator. FIG. 2 illustrates set screws 40 as coupling the housing 14 to the joined complaints plate members 16. FIGS. 3-5 illustrate alternate housing configurations and welds 41 as coupling the housing configurations to the compliant plate members. It is appreciated that any suitable housing configuration, coupling technique, and fastening technique can be implemented, which enables seal assembly 10 to function as described herein.

The shaft seal assembly 10 is provided with a plurality of compliant plate elements 16 secured at their roots 26, in a facing relation (i.e., face-to-face). As used herein, the term "facing relation" refers an orientation in which a first side surface 28 of one compliant plate element 16 is adjacent to a second side surface 30 of an immediate adjacent compliant plate element 16. Each side surface 28 and 30 extends from a leading surface 32 at a high pressure side 33 to a trailing surface 34 at a low pressure side 35 of each compliant plate element, and from a root 26 to a tip 36 of each compliant plate element 16. It is appreciated that the leading surfaces 32 and/or trailing surfaces 34 of elements 16 may be exposed at high pressure side 33 and/or low pressure side 35, respectively. In exemplary embodiments, each compliant plate element 16 is substantially planar, or flat, along each side surface 28 and 30.

Referring to FIG. 6, in exemplary embodiments, when plate elements have substantially constant thickness T, a gap 38 is defined between adjacent compliant plate elements 16 such that gap 38 is wider at an outer portion 42 than at an inner portion 44. As further described herein, the gap is pre-defined accordingly by the presence of spacer shims (not shown) alternately positioned between adjacent compliant plate elements 16 and selectively removed. Accordingly, gap 38 tapers from outer portion 42 towards inner portion 44. As such, roots 26 of plate members 16 may be considered to be "loosely packed," and tips 36 may be considered to be "tightly packed." The term "tightly packed," as used herein, refers to an orientation in which adjacent plate tips 36 are not in contact with each other but are closely spaced.

In exemplary embodiments, the compliant plate elements 16 are coupled to housing 14 such that each plate element 16 is oriented at an angle θ (also referred to herein as a "cant angle") relative to a respective tangent plane 48 of rotor 12. The tangent plane 48 is defined at a line 50 on rotor 12 that is proximate to plate tip 36. More specifically, at least one of the side surfaces 28 and/or 30 is oriented at angle θ relative to tangent plane 48. In exemplary embodiments, the cant angle θ is less than 90°. In one embodiment, cant angle θ is selected to be some specific prescribed value between approximately 20° and approximately 70°. In the exemplary embodiment, the cant angle θ is selected to ensure that plate elements 16 are angled away from a direction R of rotation of rotor 12 such that the cant angle θ facilitates rotation of rotor 12 within seal assembly 10.

Referring to FIG. 1, an axial flow resistance member 17 extends at least partially through compliant plate elements 16 via a slot 20 and facilitates preventing axial leakage flow between gaps 38. More specifically, in the exemplary embodiment, resistance member 17 extends circumferentially about housing 14, and extends radially inward from housing 14 towards rotor 12.

Referring to FIG. 2, in exemplary embodiments, the slot 20 and the axial flow resistance member 17 has a substantially constant width $W_1$, $W_2$, respectively. Furthermore, the axial flow resistance member 17 can include an upper portion 18 having width $W_3$, which can be substantially equal to the width $W_1$ of the slot 20. Alternatively, widths $W_1$, $W_2$, $W_3$, may be of any size that enables seal assembly 10 to function as described herein. Moreover, a gap 58 is defined between the axial flow resistance member 17 and the slot 20. In exemplary embodiments, the gap 58 includes a front section 62, a bridge section 63, and a back section 64. In FIG. 2, the slot 20 of compliant plate 16 and axial flow resistance member 17 of housing 14 are shown in the center of compliant plate member 16. In an alternative embodiment, the axial flow resistance member 17 and the slot 20 of the compliant plate may be offset in the axial direction from the center of housing 14.

In exemplary embodiments, dimensions of the gap 58 are selected based on predetermined hydrostatic lift and/or hydrostatic blowdown conditions. For example, the front section 62 may decrease while back section 64 increases. Such a gap configuration may cause hydrostatic blowdown. As used herein, the term "blowdown" refers to a radially inward deflection of compliant plate elements 16 under a pressure loading. In an alternative embodiment, the front section 62 may be larger than back section 64. Such a gap configuration may cause lift on plate elements 16. In exemplary embodiments, the compliant plate elements 16 experience an effective blowdown force near front section 62 and an effective lift force near back section 64, wherein front and back sections 62 and 64 are closer to each other as compared to known compliant plate seal assemblies. Because of the reduced distance between gap sections 62 and 64, the blowdown and lift forces are also closer to each other as compared to forces experience within known compliant plate seal assemblies. By reducing the distance between forces, twisting torque acting on each compliant plate member 16 is facilitated to be reduced, as compared to known compliant plate seal assemblies.

Figure 7:
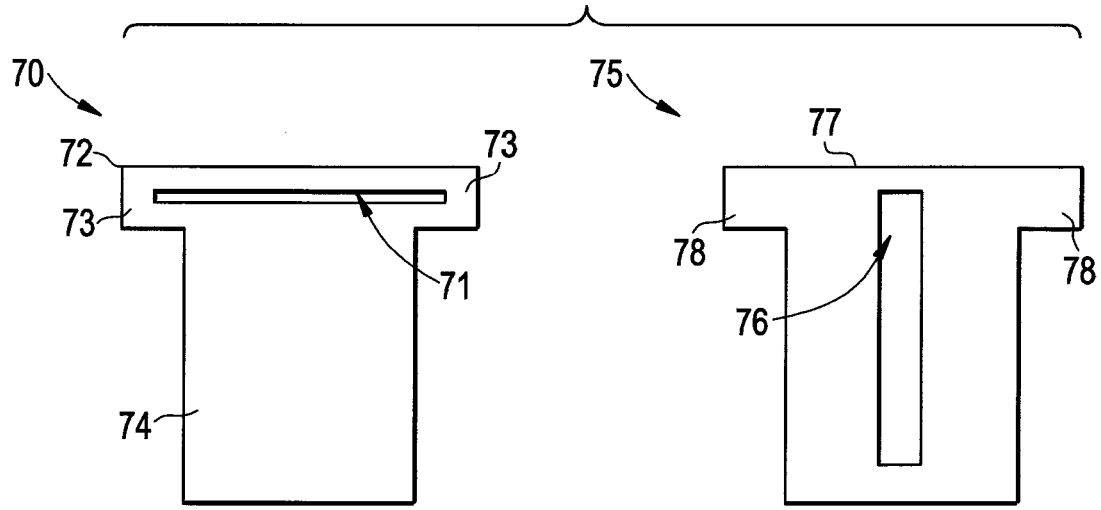
FIG. 7 illustrates a spacer shim and a T-shim in accordance with exemplary embodiments.

Exemplary methods for manufacturing the seal assembly 10 are now described. FIG. 7 illustrates a spacer shim 70 and T-shim 75 prior to manufacturing into the seal assembly 10 in accordance with exemplary embodiments. During manufacturing of the seal assembly 10 alternating rows of spacer shims 70 and T-shims 75 are tightly packed as a first step in forming the compliant plate members 16. In exemplary embodiments, the spacer shim 70 is implemented to provide the required spacing between each of the T-shims 75 in the alternately packed arrangement. The spacer shims 70 include a cut out region 71 within an upper T-region 72 of the spacer shim. As further described herein, ears 73 of the upper T-region 72 are later machined off on the left and right and then a portion 74 of the spacer shim 70 below the cut out region 71 drops out of the seal assembly 10. Thickness of the spacer shim 70 can be selected as some thickness value generally within the range 0.0005" to 0.004" to define the gap 38. In exemplary embodiments, the T-shims 75 are the shims or plates that include the flexible part of the seal assembly and are a portion of the complaint plate member 16. A center cutout 76 later defines the slot 20 that includes the radially oriented axial flow resistance member 17. The T-shims 75 further includes an upper T-region 77 that includes ears 78 that are machined off later along with the ears 73 of the spacer shims 70. The thickness of the T-shim 75 is selected as some thickness value generally within the range 0.002" to 0.030" as labeled T in FIG. 6. This manufacturing technique does not limit the spacer thickness and can work for any practical thickness larger or smaller than the specified range.

Figure 8:
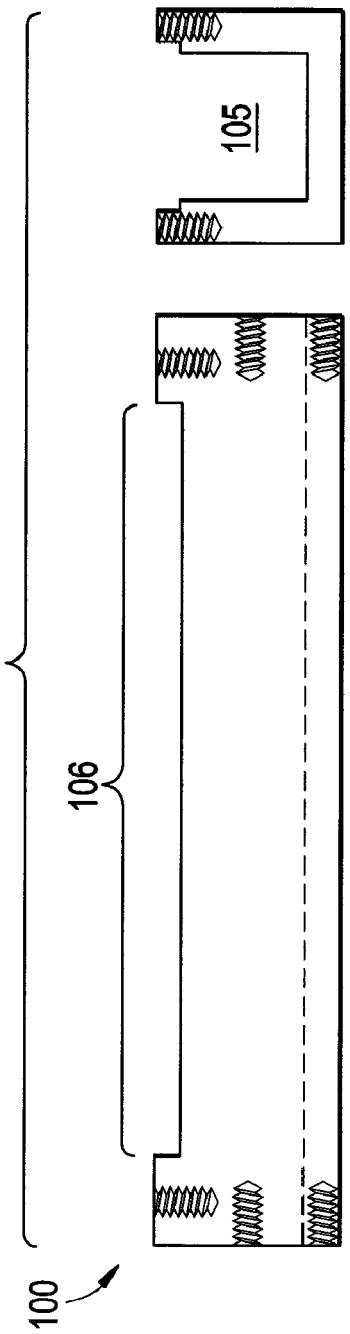
FIG. 8 further illustrates a side view and a front view of the weld body fixture.
Figure 9:
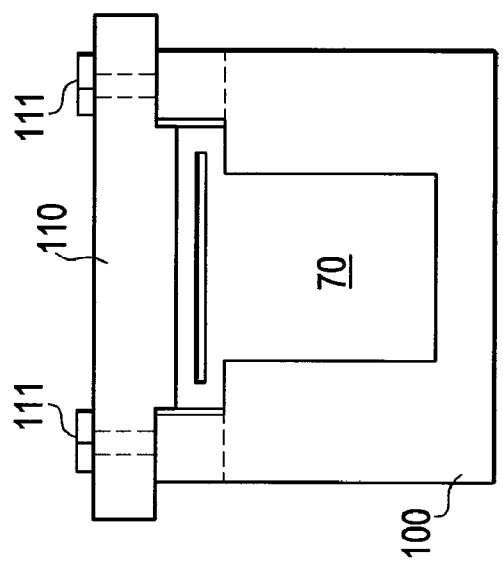
FIG. 9 illustrates a front view of a top plate mechanically affixed to the weld fixture body with an assembled spacer shim.

FIGS. 8 & 9 illustrates a side and front view of a weld fixture body 100 into which the spacer shims 70 and the T-shims 75 are alternately packed along a straight line as described above. In exemplary embodiments, the spacer shims 70 and the T-shims 75 are alternately packed within a channel 105 defined within the fixture body 100. The weld fixture body further includes a cut-out region 106, which defines a window for welding as further described herein. FIG. 9 illustrates a front view of the weld fixture body 100 assembled with the alternately spaced spacer shims 70 and T-shims 75. A spacer shim 70 is shown. FIG. 9 further illustrates a top plate 110 mechanically affixed to the weld fixture body. In exemplary embodiments, bolts 111 mechanically affix the top plate 110 to the weld fixture body 100.

FIG. 10 illustrates a side section view of an assembled weld fixture assembly 180. FIG. 11 illustrates a front section view of the welded compliant plate seal still within the weld fixture assembly 180. The weld fixture assembly 180 includes the weld fixture body 100 and the top plate 110 as described above. The weld fixture assembly 180 further includes the alternating spacer shims 70 and T-shims, now referred to as the shim pack 115. Left and right angle blocks 120, 125 are inserted into the channel 105 of the weld fixture body 100 on opposite ends of the shim pack 115. The angle blocks 120, 125 establish a fixture block angle φ of the shim pack 115 with respect to the top plate 110. The fixture block angle φ is selected to correspond with a desired angle of the shim pack 115 welded to the top plate 110. In exemplary embodiments, the angle φ can be selected as 45 degrees. A left and right end plate 130, 135 are further mechanically affixed to the weld fixture body 100. The end plates 130, 135 can be mechanically affixed to the weld fixture body 100 via bolts 136. The end plates 130, 135 retain the angle blocks 120, 125 within the channel and against the shim pack 115. Loading screws 140 can be adjusted to push the end block and sliding it to compress the shim pack 115 to minimize any spaces in a weld region 145 of the shim pack 115. The weld region 145 of the shim pack 115 is exposed through the weld fixture body 100 through a window 150 defined between the top plate 110 and the cut out region 106 as described above.

In exemplary embodiments, a weld beam is focused into the window 150 along the weld region 145 in order to weld the shim pack 115 to the top plate 110. The weld beam can be an electron beam, which provides a thin and narrow beam to minimize heating of the top plate 110 as well as a deep weld along the top plate 110 and shim pack 115. FIG. 11 illustrates welds 155 along the weld region 145 defined between the top plate 110 and the shim pack 115. As further described herein, the welds 155 runs to a depth that is past the cut out regions of both the spacer shims 70 and T-shims 75. In an alternate exemplary embodiment, the welds 155 do not extend past the cut out regions of the both the spacer shims 70 and T-shims 75.

In exemplary embodiments, after welding, the end plates 130, 135 are removed from the weld fixture body 100. The angle blocks 120, 125 are also removed from the weld fixture body 100. As a result of the weld process described above, the top plate 110 and the shim pack 115 are now welded together and are also removed as a joined assembly from the weld fixture body 100.

Figure 13:
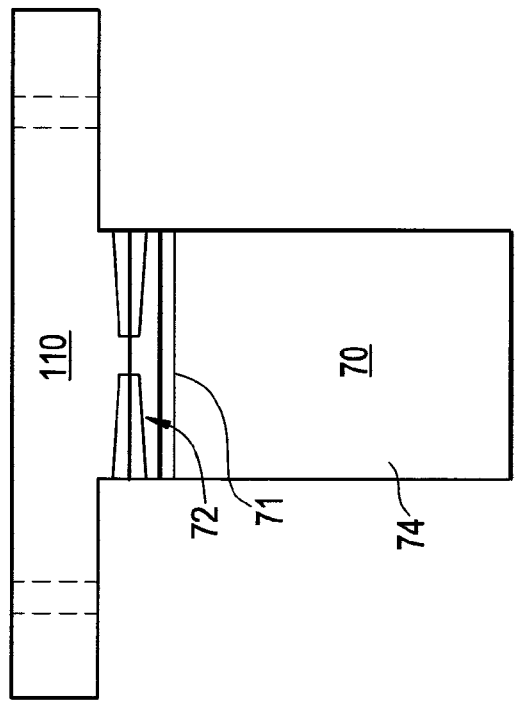
FIG. 13 illustrates the compliant plate seal after removal of ears of spacer shims and T-shims.
Figure 12:
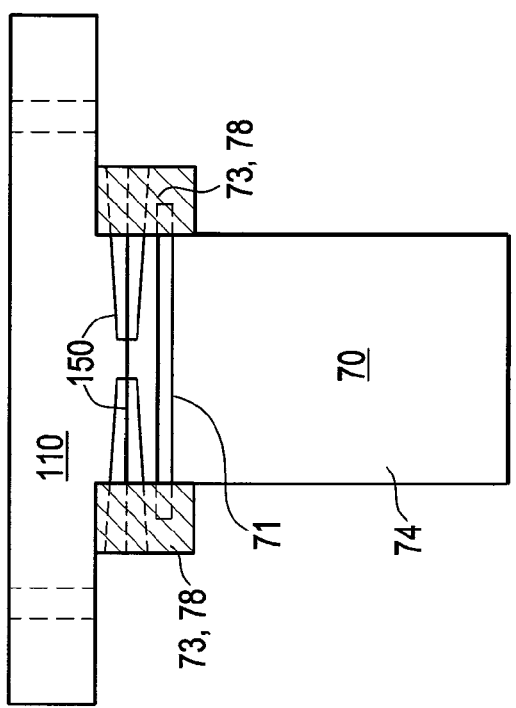
FIG. 12 illustrates the region of removal of the ears of the spacer shims and T-shims, implemented to drop out the bottom portion of the spacer shims.
Figure 14:
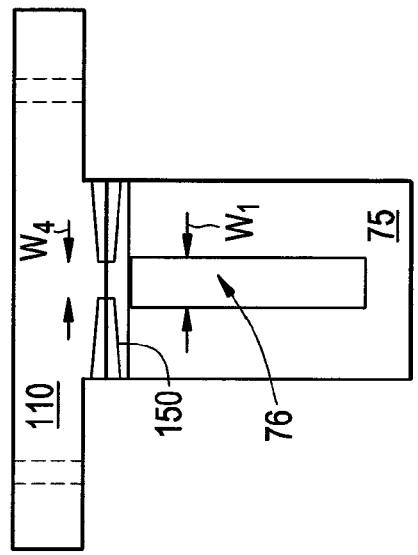
FIG. 14 illustrates the compliant plate seal after removal of the bottom of the spacer shims below the joined region.

FIGS. 12-14 illustrate machining steps for removal of the ears 73, 78 of the spacer shims 70 and T-shims 75, respectively. In FIG. 12 the ears 73, 78 are removed over the full length of the shim pack. FIG. 13 illustrates the welded top plate 110 and shim pack 115 with the ears 73, 78 removed from the shim pack. It is appreciated that any current machining techniques can be implemented to remove the ears 73, 78, including but not limited to grinding, electrical discharge machining (EDM), and milling. With the ears 73 of the spacer shims 70 removed, it is appreciated that the lower portion 74 of the spacer shim 70 is no longer supported to or attached to the upper T portion (with ears 73 removed), which is welded to the top plate 110. As such, the lower portions 74 of the spacer shims 70 fall away from the top plate 110 and shim pack 115 assembly. The remaining upper portions 72 define the spacing (and thus the gap 38) between the remaining T-shims 75. FIG. 14 illustrates the welded top plate 110 and shim pack 115, now with the lower portions 74 of the spacer shims 70 removed, exposing the remaining T-shims 75. It is appreciated that the cutout 76 defines the slot 20 as described above. It is further appreciated that the cutout 76 and the slot 20 share the same width $W_1$. In addition, the cutouts 76 of all the T-shims 75 are aligned along the shim pack 115. It is further appreciated that the depth of each of the welds 150 is such that a width $W_4$ of the remaining non-welded portions of the top plate 110 and the shim pack is less than the width $W_1$ of the cut out 76. In an alternate exemplary embodiment, the welds 150 do not extend past the cutout region but to a sufficient depth in order to secure the T-shims 75 and spacer shims 70 to the top plate, $W4 > W1$.

Figure 15:
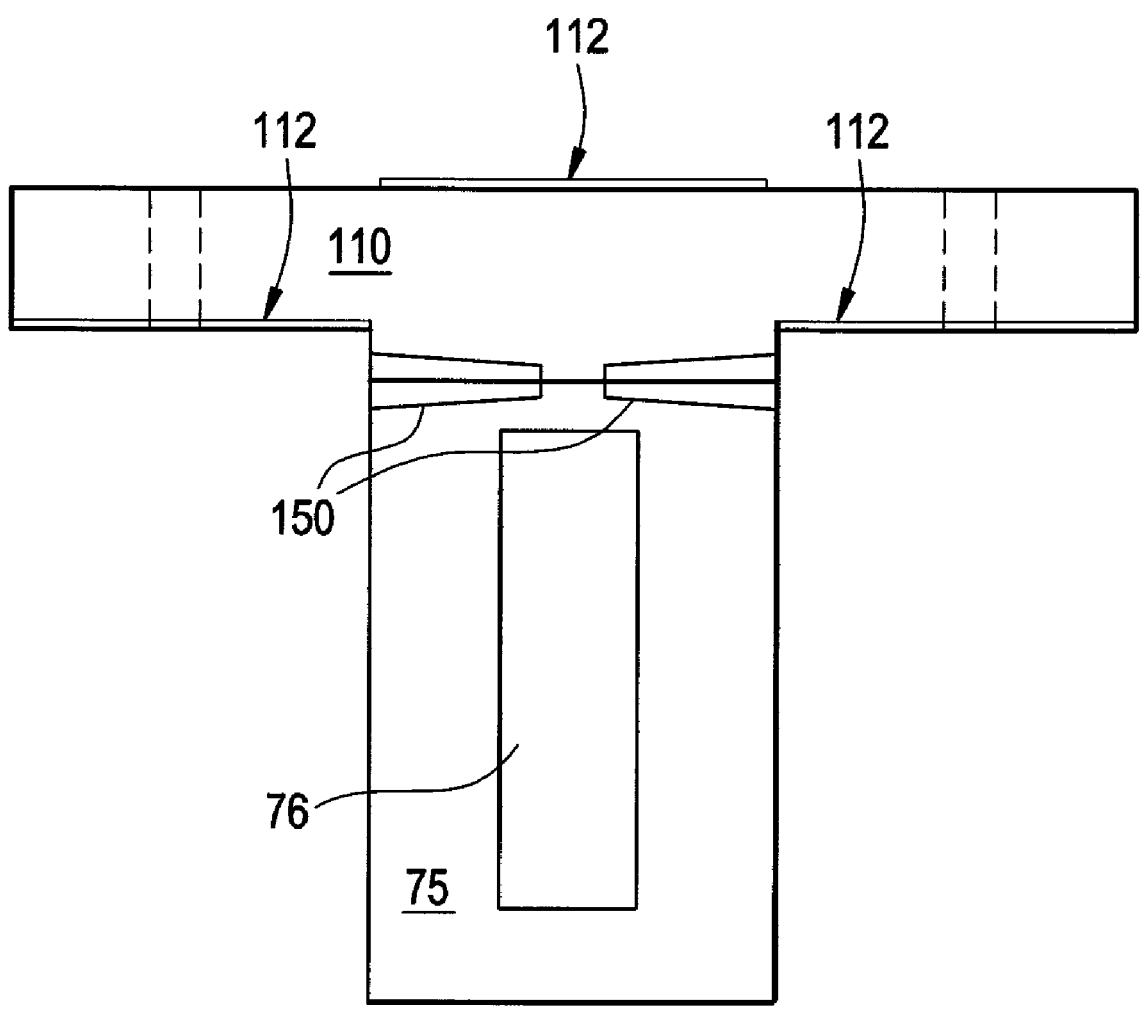
FIG. 15 illustrates a front view of a top plate and a shim pack combination showing regions, which are the reaction points for the radial bending operation.
Figure 16:
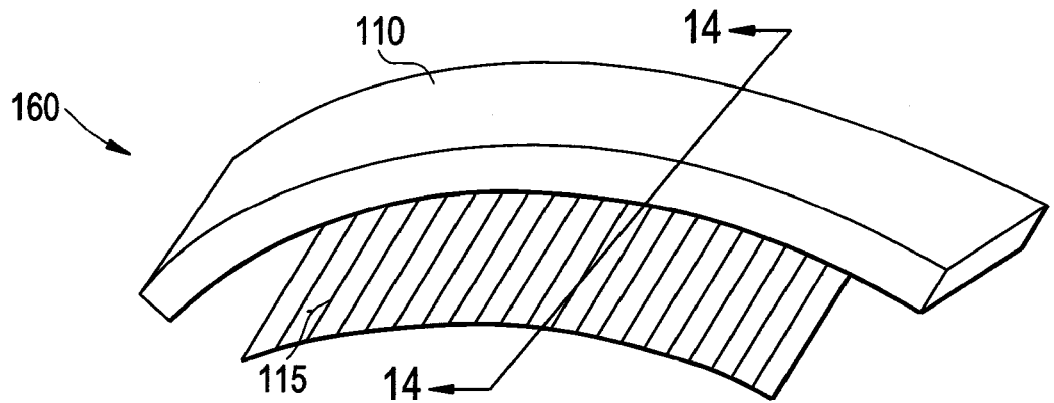
FIG. 16 illustrates a perspective side view of a top plate and a shim pack combination after radial bend in accordance with exemplary embodiments.

FIG. 15 illustrates a front view of the top plate 110 and shim pack 115 combination. The top plate 110 defines bend regions 112 such that the top plate 110 and shim pack 115 combination can be bent to a target diameter for the seal assembly as discussed above. The end regions 112 can be engaged by any current bending devices such as computer numerical control (CNC) rollers and custom dies or a press break and custom dies. It is appreciated that any current bending technique and apparatus can be implemented to create the target diameter and that the bend regions 112 provide a large enough surface area to accommodate the bending techniques and apparatuses. FIG. 16 illustrates a perspective side view of a top plate 110 and shim pack 115 combination bent in accordance with exemplary embodiments. The top plate 110 and shim pack 115 combination is now referred to as an arcuate segment 160.

Figure 17:
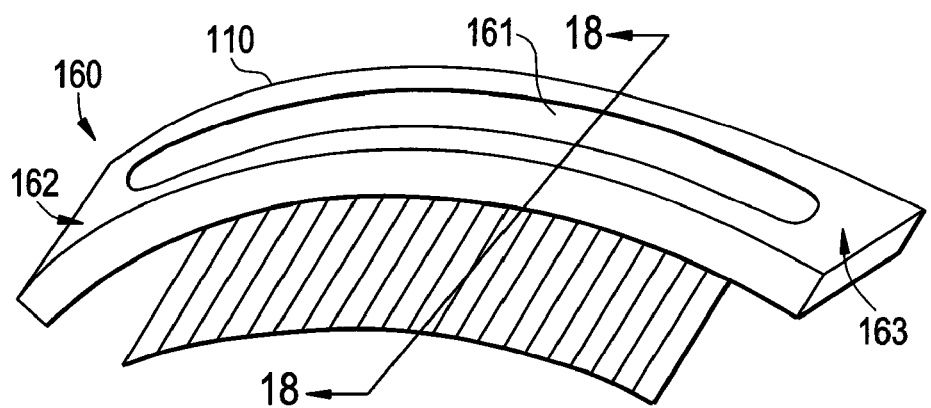
FIG. 17 illustrates a perspective side view of an arcuate segment with a central portion of a top plate machined out.
Figure 18:
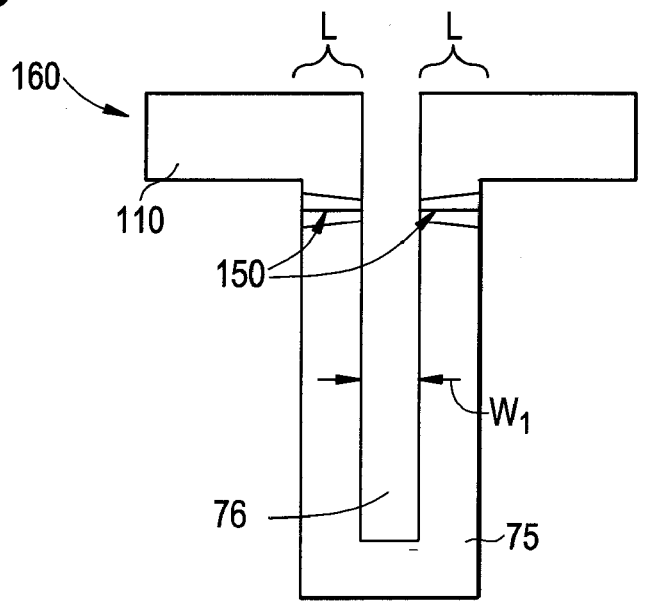
FIG. 18 illustrates a front section view of the arcuate segment of FIG. 17.

FIG. 17 illustrates a perspective side view of the arcuate segment 160 with a central portion 161 of the top plate 110 machined out. Segment end ligaments 162, 163 of the arcuate segment 160 remain intact after the machining process to maintain proper registration and alignment of left and right portions of shims so that they are in the right location for subsequent operations. FIG. 18 illustrates a front view of the arcuate segment 160 of FIG. 17. FIG. 18 shows that the cut out section 76 and the central portion 161 are continuous forming the slot 76 of width $W_1$. In addition, it is appreciated that the weld 150 covers the entire length L of the top plate 110 and the T-shim 75 therefore providing a complete weld between the top plate 110 and each T-shim 75.

Figure 19:
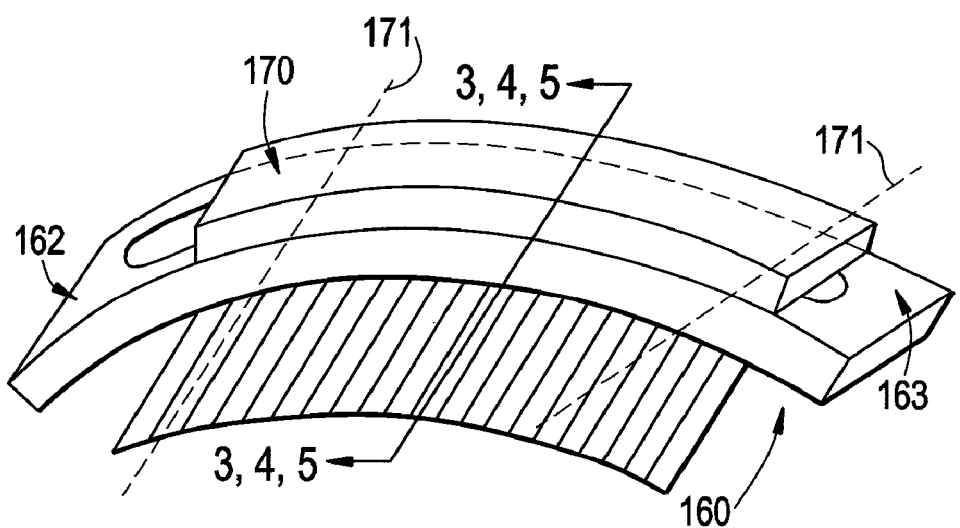
FIG. 19 illustrates an arcuate segment having an arcuate radial flow plate housing.
Figure 20:
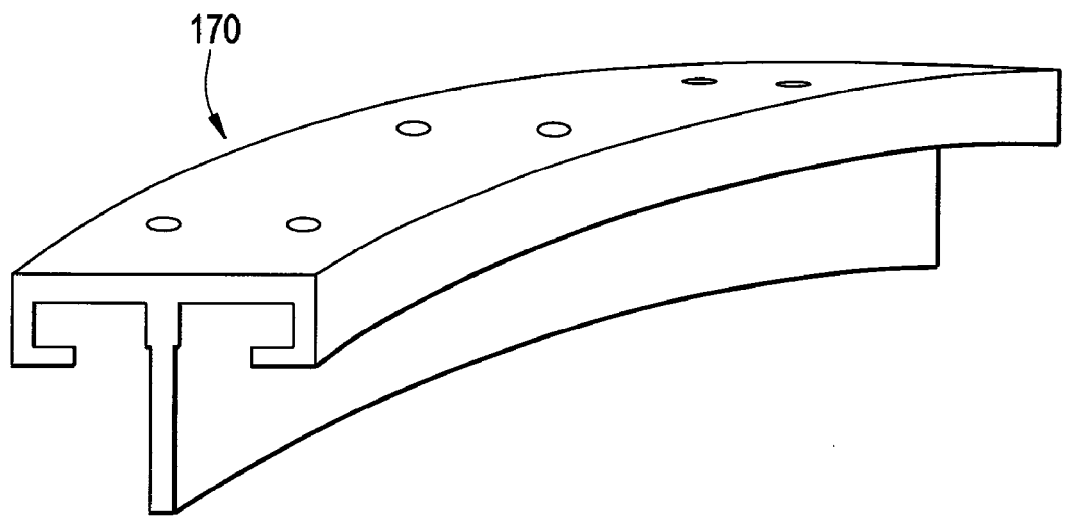
FIG. 20 illustrates an exemplary mechanically affixed arcuate radial flow plate housing.

Referring again to FIGS. 2-5, embodiments of a housing 14 including an integral axial flow resistance member 17 are illustrated. The housing and the axial flow resistance member 17 are now referred to as an arcuate radial flow plate housing 170 as shown in FIG. 20. FIG. 19 illustrates an arcuate segment 160 having an arcuate radial flow plate housing 170. In exemplary embodiments, the arcuate radial flow plate housing 170 is affixed to the arcuate segment via mechanical fasteners or welding as described above. The arcuate radial flow plate housing 170 is then machined to remove ends (including the ligaments 162, 163), generally shown as chord cuts 171, which are coplanar with the T-shim 70 at the chord cut 171. The cross sectional view for FIGS. 3-5 is shown in FIG. 19. FIGS. 3-5 illustrate the implementation of welds 41 to affix the arcuate radial flow plate housing 170 to the arcuate segment. FIG. 2 illustrates a mechanically affixed arcuate radial flow plate housing 170. FIG. 20 illustrates an exemplary mechanically affixed arcuate radial flow plate housing 170. For the mechanically affixed arcuate radial flow plate housing 170, the arcuate segment 160 is machined as described above. The end cuts are made co-planar to the T-shims 70 as described. The arcuate radial flow plate housing 170 is then mechanically assembled to the arcuate segment 160.

The exemplary manufacturing methods described herein provide a method suitable for automation in which machine-stacked alternating spacer and T-shim stampings are loaded into cartridges and the cartridges are slid into the electron beam weld fixture. This automated process minimizes manual assembly over the alternative, which is hand assembly to arcuate housings. Since all seals diameters are assembled and welded on the straight, no complex diameter dependant fixturing is required, which provides significant cost savings over one-off diameter dependant weld or braze fixtures. The manufacturing methods described herein further provide a cycle advantage, which facilitates manufacturing straight shim stock and bending it to the required diameter once an order is placed. With CNC roll bending die cost for different diameters if minimal. Full depth welds along the entire edges of T-shims can be made to fully join them to the top. Alternating spacer and T-shims are packed tightly in the straight weld body fixture at the required angle prescribed by the end fixture angle blocks. They are pressed tightly together utilizing the load screws on the end plates. This tight packing minimizes or eliminates gaps between welded shims. Therefore, when welded, the impact of weld shrinkage causing T-plate distortion is minimized. T-plate spacing is held very accurately, which minimizes T-shim stress and seal leakage on the finished product. Joining the shims in a straight configuration minimizes costs associated with custom fixturing for each seal diameter. Seals of any diameter can be bent from the straight stock. An appropriately sized spacer shim is chosen for the range of diameters being bent. The straight weld fixture allows precise axial positioning of thousands of shims to within a few mils. Stacking with alternating spacer shims and T-shims lends itself to a machine-based automated shim stack process, which further reduces hand or manual stacking operations for assembling shims. This is a cost and cycle advantage over processes that must be done manually.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A compliant plate seal manufacturing method, comprising:
   assembling a plurality of t-shims, each of the plurality of t-shims having a cut-out, and a plurality of spacer shims packed into a weld fixture at a prescribed angle, thereby forming a shim pack having a front and rear end and sides, wherein each of the spacer shims includes a cut-out;
   welding the sides of the shim pack to a top plate that is secured in the weld fixture;
   machining off upper portions of the spacer shims such that a bottom portion below the cutout of each spacer shim is removed from the shim pack and
   shaping the shim pack into a target diameter,
   wherein the shim pack includes a radial cutout region.

2. The method as claimed in claim 1 further comprising applying a radial flow plate to the shim pack.

3. The method as claimed in claim 1 further comprising removing the top plate and shim pack from the weld fixture.

4. The method as claimed in claim 1 wherein an upper portion of the spacer shims and the T-shims are welded to the top plate during welding the sides of the shim pack.

5. The method as claimed in claim 1 wherein the plurality of t-shims and the plurality of spacer shims are alternately packed into the weld fixture.

6. The method as claimed in claim 1 further comprising performing a radial bend of the top plate and shim pack assembly thereby forming a shape of at least one of a shaft seal or an arcuate segment of a shaft seal.

7. The method as claimed in claim 6 further comprising affixing a radial flow plate to the top plate.

8. The method as claimed in claim 7 wherein the cut-out of each of the t-shims is aligned with the removed central portion of the top plate.

9. The method as claimed in claim 8 wherein the welding is performed with at least one of an electron beam and a laser beam.

10. The method as claimed in claim 1 further comprising thinning a thickness of the top plate prior to performing the radial bend.

11. The method as claimed in claim 1 wherein the shim pack is welded through a window on the weld fixture.

* * * * *